(12) United States Patent
Sasagawa et al.

(10) Patent No.: US 8,138,270 B2
(45) Date of Patent: Mar. 20, 2012

(54) PROCESS FOR PRODUCING BLOCK COPOLYMER, AND BLOCK COPOLYMER OR HYDROGENATED PRODUCT THEREOF

(75) Inventors: Masahiro Sasagawa, Tokyo (JP); Katsunori Nitta, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 366 days.

(21) Appl. No.: 12/310,165

(22) PCT Filed: Aug. 16, 2006

(86) PCT No.: PCT/JP2006/316109
§ 371 (c)(1),
(2), (4) Date: Feb. 13, 2009

(87) PCT Pub. No.: WO2008/020476
PCT Pub. Date: Feb. 21, 2008

(65) Prior Publication Data
US 2010/0016508 A1    Jan. 21, 2010

(51) Int. Cl.
*C08F 2/00* (2006.01)
*C08F 287/00* (2006.01)

(52) U.S. Cl. ......... 525/259; 525/88; 525/245; 525/247; 525/313; 525/314; 525/266

(58) Field of Classification Search ............ 525/88, 525/245, 247, 266, 313, 314, 259
See application file for complete search history.

(56) References Cited

U.S. PATENT DOCUMENTS 4,960,842 A * 10/1990 Lo et al. ................ 526/175
5,654,384 A     8/1997 Halasa et al.
5,677,402 A    10/1997 Halasa et al.
5,906,956 A     5/1999 Halasa et al.
7,893,156 B2    2/2011 Hoshi et al.

FOREIGN PATENT DOCUMENTS

| CN | 1332183 | 1/2002 |
|---|---|---|
| EP | 0 477 512 A1 | 4/1992 |
| EP | 1 031 586 A1 | 8/2000 |
| JP | 04-255708 | 9/1992 |
| JP | 04-255733 A | 9/1992 |
| JP | 04-255734 | 9/1992 |
| JP | 08-109219 A | 4/1996 |
| JP | 10067838 A | 3/1998 |
| JP | 2006-241289 A | 9/2006 |
| WO | WO-00/15681 | 3/2000 |
| WO | 2003/091303 A1 | 6/2003 |

OTHER PUBLICATIONS

Hawley's Condensed Chemical Dictionary, 14th Edition 2002.*
I. M. Kolthoff, et al., Determination of Polystyrene in GR-S Rubber, Journal of Polymer Science, vol. 1, No. 5, pp. 429-433, Jun. 5, 1946.

* cited by examiner

*Primary Examiner* — Vasu Jagannathan
*Assistant Examiner* — Mark Kaucher
(74) *Attorney, Agent, or Firm* — Morgan, Lewis & Bockius LLP

(57) ABSTRACT

The present invention provides a process for producing a block copolymer in high productivity, by anionic polymerization by use of a lithium initiator, and also to provide the block copolymer and a hydrogenated product thereof, the block copolymer having a conjugated diene block portion with a high vinyl bond content and a vinyl aromatic block portion with a narrow molecular weight distribution and exhibiting a narrow molecular weight distribution and high strength. A conjugated diene monomer and a vinyl aromatic monomer by use of a lithium initiator, are block copolymerized by making a tertiary amine compound and (2) sodium alkoxide coexist, wherein (2)/(1) (a molar ratio)=from 0.01 or more to less than 0.1.

20 Claims, No Drawings

PROCESS FOR PRODUCING BLOCK COPOLYMER, AND BLOCK COPOLYMER OR HYDROGENATED PRODUCT THEREOF

TECHNICAL FIELD

The present invention relates to a process for producing a block copolymer by copolymerizing a conjugated diene monomer and a vinyl aromatic monomer by use of a lithium initiator, and also relates to the block copolymer or a hydrogenated product thereof. According to the production process of the present invention, a block copolymer having a block portion mainly comprising a conjugated diene with a high vinyl bond content and a block portion comprising the vinyl aromatic monomer with a narrow molecular weight distribution and exhibiting a narrow molecular weight distribution can be obtained in high productivity. The term "vinyl bond content" refers to the proportion of the conjugated diene monomers incorporated in the polymer with a 1,2-bond and a 3,4-bond based on the conjugated diene monomers incorporated with 1,2-bond, 3,4-bond, and 1,4-bond in the present invention.

BACKGROUND ART

A block copolymer comprising a conjugated diene monomer and a vinyl aromatic monomer exhibits elasticity at room temperature even without vulcanization, the elasticity being comparable to that of vulcanized natural rubber and synthetic rubber. Further, at high temperature, the copolymer shows processability similar to that of a thermoplastic resin. Thus, the block copolymer is widely used in applications such as footwear, plastic modification, asphalt modification, an area of adhesives, household articles, packaging materials for household appliances and industrial components, toys, and the like. Furthermore, the hydrogenated product of the block copolymer has excellent weatherability and heat resistance. Therefore, in addition to the aforementioned applications, the hydrogenated product is used widely for automotive parts, medical devices, and the like.

In recent years, substitutes for a soft vinyl chloride resin have been investigated. As a substitute material having flexibility, a composition of a hydrogenated block copolymer and a polypropylene resin is disclosed (see, for example, Patent Document 1), the hydrogenated block copolymer being obtained by hydrogenating a copolymer comprising a block having a vinyl aromatic hydrocarbon and a block wherein a vinyl bond content in a diene portion is 62% or higher. The block copolymer used herein must have the high vinyl bond content in the conjugated diene portion in order to improve compatibility thereof with polypropylene. However, in case of anionic polymerization, the vinyl bond content of the diene portion is related to polymerization temperature, and in order to obtain the high vinyl bond content; the polymerization has to be conducted at low temperature. Accordingly, the productivity of the block copolymer with the high vinyl bond content has been extremely low.

As a process for producing a styrene block copolymer having such a high vinyl bond content, a method is generally employed, whereby a polar material such as tetrahydrofuran is added during anionic polymerization. However, even when such the process is employed, there was a limit to the vinyl bond content of the diene portion. Also, molecular weight distribution of the block comprising the vinyl aromatic hydrocarbon is so broad that only the block copolymer with low strength could be obtained.

Further, as a process for producing polybutadiene rubber having a high vinyl bond content suitable for tire applications, a method to polymerize 1,3-butadiene in the presence of sodium alkoxide and a polar material is disclosed (see, for example, Patent Documents 2 and 3). However, this method had a problem that a dimerization reaction occurs during polymerization, resulting in broad molecular weight distribution.

Patent Document 1: International Publication No. WO 00/15681
Patent Document 2: U.S. Pat. No. 5,654,384
Patent Document 3: U.S. Pat. No. 5,906,956

DISCLOSURE OF THE INVENTION

Problems to be Solved by the Invention

An object of the present invention is to provide a process for producing a block copolymer in high productivity, by anionic polymerization by use of a lithium initiator, and also to provide the block copolymer and a hydrogenated product thereof, the block copolymer having a conjugated diene block portion with a high vinyl bond content and a vinyl aromatic block portion with a narrow molecular weight distribution and exhibiting a narrow molecular weight distribution and high strength.

Means for Solving the Problems

The present inventors conducted diligent research to solve the above mentioned object and, as a result, found that the object can be achieved effectively by making a tertiary amine compound and a minute amount of sodium alkoxide coexist in block copolymerization by use of a lithium initiator. This finding led to completion of the present invention.

Accordingly, the present invention relates to the following:

1. a process for producing a block copolymer by block copolymerizing a conjugated diene monomer and a vinyl aromatic monomer by use of a lithium initiator, comprising copolymerizing in coexistence of following substances, (1) and (2):
   (1) a tertiary amine compound
   (2) sodium alkoxide,
   wherein (2)/(1) (a molar ratio)=from 0.01 or more to less than 0.1;

2. a block copolymer comprising a conjugated diene monomer and a vinyl aromatic monomer, or a hydrogenated product thereof, wherein a vinyl bond content derived from the conjugated diene monomer is 50% or more, a vinyl aromatic monomer content in the block copolymer is 30% by weight or more, and a molecular weight distribution, defined as a ratio of a weight average molecular weight to a number average molecular weight of a single peak as measured by gel permeation chromatography (GPC), is 1.4 or less;

3. a block copolymer comprising a conjugated diene monomer and a vinyl aromatic monomer, or a hydrogenated product thereof, wherein a vinyl bond content derived from the conjugated diene monomer is 50% or more, a vinyl aromatic monomer content in the block copolymer is less than 30% by weight, a molecular weight distribution, defined as a ratio of a weight average molecular weight to a number average molecular weight of a single peak as measured by gel permeation chromatography (GPC), is 1.2 or less, and/or a molecular weight distribution of a polymer block comprising the vinyl aromatic monomer is 1.2 or less.

Advantage of the Invention

The production process of the present invention can make, in the block copolymer, the vinyl bond content of the conjugated diene block portion high and molecular weight distribution of the vinyl aromatic monomer block portion narrow, and also provide the production process for producing the block copolymer having narrow molecular weight distribution and high strength in high productivity.

BEST MODE FOR CARRYING OUT THE INVENTION

Hereinafter, the present invention will be described in detail.

The production process of the present invention is a process for producing a block copolymer comprising a conjugated diene monomer and a vinyl aromatic monomer in high productivity.

The conjugated diene monomer used in the present invention is a diolefin having a pair of conjugated double bonds. Examples of the monomer may include 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, with 1,3-butadiene being especially preferable. These monomers may be used not only singly but also in combination of two or more monomers.

Further, Examples of the vinyl aromatic monomer used in the present invention may include styrene, α-methylstyrene, p-methylstyrene, divinylbenzene, 1,1-diphenylethylene, N,N-dimethyl-p-aminoethylstyrene, N,N-diethyl-p-aminoethylstyrene, with styrene being especially preferable. These monomers may be used not only singly but also in combination of two or more monomers.

In the present invention, the block copolymer is obtained by anionic living polymerization in a hydrocarbon solvent by use of a lithium initiator. Examples of the hydrocarbon solvent may include aliphatic hydrocarbons such as n-butane, isobutane, n-pentane, n-hexane, n-heptane, and n-octane; cycloaliphatic hydrocarbons such as cyclohexane, cycloheptane, and methylcycloheptane; and aromatic hydrocarbons such as benzene, toluene, xylene, and ethylbenzene.

Further, Examples of the lithium initiator may include aliphatic and aromatic hydrocarbyl lithium compounds having from 1 to 20 carbon atoms. The lithium compounds include a compound having one lithium in a molecule and a dilithium compound, a trilithium compound, or a tetralithium compound, having a plurality of lithium atoms in a molecule. Specific examples thereof may include n-propyllithium, n-butyllithium, sec-butyllithium, tert-butyllithium, n-pentyllithium, n-hexyllithium, benzyllithium, phenyllithium, tolyllithium, a reaction product of diisopropylbenzene and sec-butyllithium, and, further, a reaction product of divinylbenzene, sec-butyllithium, and a small amount of 1,3-butadiene. Among these, n-butyllithium and sec-butyllithium are preferable from a standpoint of polymerization activity.

The amount of the lithium initiator used depends on desired molecular weight of the block copolymer but is generally from 0.01 to 0.5 phm (parts per hundred parts of monomer by weight), preferably, from 0.01 to 0.2 phm, more preferably from 0.02 to 0.15 phm.

In the present invention, a tertiary amine compound is added when the conjugated diene monomer and the vinyl aromatic monomer are block copolymerized with the lithium initiator as the polymerization initiator. Examples of the tertiary amine compound may include a compound represented by a general formula $R^1R^2R^3N$ (in the formula, $R^1$, $R^2$, and $R^3$ are a hydrocarbyl group or a hydrocarbyl group comprising a tertiary amino group, both groups having from 1 to 20 carbon atoms). Examples thereof may include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, N,N'-dioctyl-p-phenylenediamine. Among these, N,N,N',N'-tetramethylethylenediamine is especially preferable.

The tertiary amine compound is used in order to make the vinyl bond content of the conjugated diene block portion higher. The amount of the amine compound used may be adjusted depending on the desired vinyl bond content of the conjugated diene portion. The desired vinyl bond content of the conjugated diene block portion in the present invention is 50% or more. Thus, the amount of the tertiary amine compound used is, based on the lithium initiator, preferably from 0.1 to 4 (mol/Li), more preferably from 0.2 to 3 (mol/Li).

In the present invention, sodium alkoxide is made coexistent during the copolymerization. The sodium alkoxide used is a compound represented by a general formula NaOR (in the formula, R is an alkyl group having 2 to 12 carbon atoms). Among them, sodium alkoxide with an alkyl group having from 3 to 6 carbon atoms is preferable. Sodium t-butoxide and sodium t-pentoxide are especially preferable.

The amount of sodium alkoxide used in the present invention is, based on the tertiary amine compound, from 0.01 or more to less than 0.1 (a molar ratio), preferably from 0.01 or more to less than 0.08 (a molar ratio), more preferably from 0.03 or more to less than 0.08 (a molar ratio), further preferably from 0.04 or more to less than 0.055 (a molar ratio). When the amount of sodium alkoxide is in this range, a block copolymer having a conjugated diene block portion with a high vinyl bond content and a vinyl aromatic block portion with a narrow molecular weight distribution, and exhibiting a narrow molecular weight distribution and high strength can be obtained in high productivity.

In the present invention, the process for block copolymerizing the conjugated diene monomer and the vinyl aromatic monomer with the lithium initiator as the polymerization initiator may be a batch polymerization, a continuous polymerization, or a combination of both. Especially, to obtain the copolymer with a narrow molecular weight distribution and high strength, the batch polymerization process is preferred. The polymerization temperature is generally from 0° C. to 150° C., preferably from 30° C. to 120° C., more preferably from 50° C. to 100° C. The time required for polymerization varies depending on conditions but is generally 24 hours or less, especially preferably from 0.1 to 10 hours. The atmosphere of the polymerization system is preferably an inert gas such as nitrogen. The polymerization pressure is not particularly limited as long as the pressure is maintained in a range sufficient to keep the monomer and solvent in a liquid phase at the aforementioned range of polymerization temperature. Further, attention has to be paid so that impurities which may deactivate the initiator and a living polymer, such as, for example, water, oxygen, and carbon dioxide, do not get into the polymerization system.

In the present invention, a coupling reaction may be carried out by adding a necessary amount of a coupling agent having two or more functional groups upon completion of the aforementioned polymerization. There is no particular limitation oh the bifunctional coupling agents and any known agents may be employed. Examples thereof may include dihalogen compounds such as dimethyldichlorosilane and dimethyldibromosilane; dimethyldimethoxysilane, dimethyldiethoxysilane; acid esters such as methyl benzoate, ethyl benzoate, phenyl benzoate, and phthalic acid esters; epoxy compounds of bisphenol A. Further, as coupling agents having three or more functionalities, any known material may be used with no particular limitation. Examples thereof may include a tri- or more polyalcohol; a polyfunctional epoxy compound such as an epoxidized soy bean oil and diglycidyl bisphenol A; silicon halides represented by a general formula $R_{4-n}SiX_n$ (in the formula, R represents a hydrocarbon group having from 1 to 20 carbon atoms; X represents a halogen; n is an integer of 3 or 4), wherein examples thereof may include methylsilyl trichloride, t-butylsilyl trichloride, silicon tetrachloride, and brominated compounds of these; alkoxy silane such as tetramethoxysilane, tetraethoxysilane and the like; halogenated tin compounds represented by a general formula $R_{4-n}SnX_n$ (in the formula, R represents a hydrocarbon group having from 1 to 20 carbon atoms; X represents a halogen; n is an integer of 3 or 4), wherein examples thereof may include a polyhalide compound such as methyltin trichloride, t-butyltin trichloride, and tin tetrachloride. Also, there may be used dimethyl carbonate, diethyl carbonate, and the like.

In the present invention, a modifying agent which generates a functional group-containing group may be addition reacted with the living terminal of the block copolymer obtained by the aforementioned process. Examples of the functional group-containing group may include a group comprising at least, one functional group selected from, for example, a hydroxyl group, a carbonyl group, a thiocarbonyl group, an acid halide group, an acid anhydride group, a carboxyl group, a thiocarboxyl group, an aldehyde group, a thioaldehyde group, a carboxylic acid ester group, an amide group, a sulfonic acid group, a sulfonic acid ester group, a phosphoric acid group, a phosphate group, an amino group, an imino group, a nitrile group, a pyridyl group, a quinoline group, an epoxy group, a thioepoxy group, a sulfide group, an isocyanate group, an isothiocyanate group, a silyl halide group, a silanol group, an alkoxy silyl group, a tin halide group, an alkoxy tin group, and a phenyl tin group.

Examples of the modifying agents having functional groups may include tetraglycidyl meta-xylene diamine, tetraglycidyl-1,3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropyldimethylphenoxysilane, bis(γ-glycidoxypropyl)methylpropoxysilane, 1,3-dimethyl-2-imidazolidinone, 1,3-diethyl-2-imidazolidinone, N,N'-dimethylpropyleneurea, and N-methylpyrrolidone. In the present invention, the reaction temperature is preferably from 0 to 150° C., more preferably from 20 to 120° C. The time required for the modification reaction varies depending on other conditions but is preferably 24 hours or less, especially preferably from 0.1 to 10 hours.

The hydrogenated block copolymer is prepared by hydrogenating the block copolymer obtained in the foregoing. The hydrogenated block copolymer with the low content of the vinyl aromatic compound and the high vinyl bond content may be effective as the composition with polypropylene and the like for the substitute material for the soft vinyl chloride resin. On the other hand, the hydrogenated block copolymer with the high content of the vinyl aromatic compound and the high vinyl bond content is very effective as a modifier for polystyrene and polyphenylene ether resins, and as a compatibilizer for polystyrenes or polyphenylene ethers with polypropylene resins.

Especially preferable examples of hydrogenation catalysts may include titanocene compounds, reducing organometallic compounds, and mixtures of the titanocene compounds and the reducing organometallic compounds. Examples of the titanocene compounds may include those described in Japanese Patent Laid-Open No. H8-109219. Specific examples thereof may include compounds having at least one ligand having a (substituted) cyclopentadienyl skeleton, an indenyl skeleton, or a fluorenyl skeleton, such as bis(cyclopentadienyl)titanium dichloride and monopentamethylcyclopentadienyltitanium trichloride and the like. Further, examples of the reducing organometallic compounds may include organic alkali metal compounds such as organolithium compounds, organomagnesium compounds, organoaluminum compounds, organoboron compounds, or organozinc compounds. In the present invention, the hydrogenation reaction is carried out generally at a temperature range of from 0 to 200° C., more preferably at a range of from 30 to 150° C.

The pressure of hydrogen used in the hydrogenation reaction is recommended to be in a range of from 0.1 to 15 MPa, preferably from 0.2 to 10 MPa, more preferably from 0.3 to 5 MPa. Further, the reaction time for the hydrogenation is generally from 3 minute to 10 hours, preferably from 10 minutes to 5 hours. The hydrogenation reaction may be carried out by any of a batch process, a continuous process, or a combination of both.

From a block copolymer solution obtained in a manner described above, a residue of a catalyst may be removed if necessary and the copolymer may be separated. Methods for separating a solvent include a method whereby the solvent is recovered by precipitating the copolymer with addition to a reaction solution of a polar solvent such as acetone or an alcohol and the like, which works as a poor solvent for the copolymer, a method whereby the reaction mixture is poured into hot water under stirring and the solvent is removed and recovered by steam stripping, or a method whereby the polymer solution is directly heated to distil off the solvent.

The structure of the styrene block copolymer produced according to the present invention is not particularly limited and the present invention may be applied to copolymers of any structure. Examples thereof may include copolymers having structures represented by the following general formula:

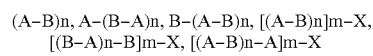

(A–B)n, A–(B–A)n, B–(A–B)n, [(A–B)n]m–X, [(B–A)n–B]m–X, [(A–B)n–A]m–X wherein A is a vinyl aromatic polymer block, B is a block of conjugated diene polymer or a block of random copolymer of a conjugated diene monomer and a vinyl aromatic monomer. The boundary of each block is not necessarily defined clearly. Further, n is an integer of 1 or more, preferably an integer from 1 to 5, and m is an integer of 2 or more, preferably an integer from 2 to 11. X represents a residue of the coupling agent or a residue of a polyfunctional initiator.

A weight average molecular weight of a block copolymer obtained in the present invention is recommended to be in a range of from 50 thousands to 500 thousands, preferably from 70 thousands to 300 thousands. Also, the block copolymer has a characteristic that its molecular weight distribution is narrow. When the content of a vinyl aromatic compound in the block copolymer, obtained by a batch polymerization process, is 30% by weight or more, a molecular weight distribution of a single peak measured by gel permeation chromatography (GPC) is 1.4 or less, preferably 1.3 or less. Also, when the content of the vinyl aromatic compound in the block copolymer is less than 30% by weight, a molecular weight distribution of a single peak is 1.2 or less, preferably 1.15 or less, more preferably 1.1 or less, especially preferably 1.08 or less. When a block copolymer is obtained by a coupling reaction, a single peak refers to a peak of the polymer which remained unreacted in the coupling reaction. Further, a molecular weight distribution of the polymer containing the vinyl aromatic compound monomer is 1.2 or less, preferably 1.17 or less. In addition, a molecular weight of the block copolymer and the polymer block comprising the vinyl aromatic compound monomer is a weight average molecular weight obtained by converting the molecular weight of the chromatogram peak, measured by gel permeation chromatography (GPC) measurement, according to a calibration curve (prepared by use of a peak molecular weight of commercial standard polystyrene samples). The molecular weight distribution of the block copolymer and the polymer block comprising the vinyl aromatic compound monomer may be obtained similarly from GPC measurement and is a ratio of the weight average molecular weight to the number average molecular weight.

EXAMPLES

Hereinafter, the present invention will be described specifically in terms of Examples but the present invention is not limited in any way by these Examples.

Further, in the following Examples, measurements and analyses of copolymers were carried out as follows.

I-1) Measurement of Conversion of Each Monomer

The measurement was conducted by use of a gas chromatograph (GC-14B, manufactured by Shimadzu Corp.). In addition, the column packing was Apiezon grease. Butadiene was measured at a constant temperature of 90° C. and styrene was measured with temperature elevation from 90° C. to 150° C.

I-2) Styrene Content in the Block Copolymer

The measurement was conducted by use of an ultraviolet spectrophotometer (UV-2450, manufactured by Shimadzu Corp.).

I-3) Vinyl Bond Content in the Block Copolymer (Diene Portion)

The measurement was conducted by use of an infra-red spectrophotometer (FT/IR-230, manufactured by JASCO Corp.). The vinyl bond content was calculated by the Hampton method.

I-4) Molecular Weight and Molecular Weight Distribution of the Block Copolymer

The measurement was conducted by GPC (the instrument was manufactured by Waters Corp.). Tetrahydrofuran was used as the solvent and measurement was conducted at 40° C. The weight average molecular weight was calculated based on a calibration curve prepared by use of commercial standard polystyrene samples with known weight average molecular weights and number average molecular weights. In addition, the molecular weight distribution is a ratio of the weight average molecular weight (Mw) to the number average molecular weight (Mn).

I-5) Molecular Weight and Molecular Weight Distribution of the Styrene Block of the Block Copolymer The block copolymer was decomposed by an osmium tetroxide acid method described in I. M. Kolthoff, et al., J. Polym. Sci., 1, 429 (1946). In addition, a solution of 0.1 g of the osmium acid in 125 ml of tert-butanol was used for the decomposition. The resultant solution containing the styrene block was measured by GPC in the same manner as in I-4) above.

I-6) Degree of Hydrogenation of the Double Bond of the Conjugated Diene Monomer Unit of the Hydrogenated Block Copolymer (Hydrogenation Ratio)

The hydrogenated copolymer after hydrogenation was measured by a nuclear magnetic resonance spectrometer (DPX-400, manufactured by Bruker Corp. (Germany)).

I-7) Measurement of Tensile Strength of the Hydrogenated Block Copolymer

Tensile strength was measured according to JIS K6251. The elongation speed was 500 mm/min., and the temperature of measurement was 23° C.

Example 1

A batch polymerization was carried out using a 10 L reaction vessel equipped with a stirrer and a jacket. First, 1 L of cyclohexane was charged, followed by n-butyllithium (hereinafter referred to as Bu-Li) in an amount of 0.06 parts by weight based on 100 parts by weight of total monomer, N,N,N',N'-tetramethylethylenediamine (hereinafter referred to as TMEDA) in an amount of 1.8 mol based on 1 mol of Bu-Li, and sodium t-pentoxide (hereinafter referred to as NaOAm) in an amount of 0.055 mol based on TMEDA. As the first step, a cyclohexane solution (concentration, 20% by weight) containing 7 parts by weight of styrene was charged over a time period of 10 minutes, followed by further polymerization for 10 minutes (the temperature was controlled at 70° C. during polymerization). At this point, a sample of the polymer solution was taken and a conversion of styrene was measured to give a value of 100%. Next, as the second step, a cyclohexane solution (concentration was 20% by weight) containing 86 parts by weight of butadiene was charged over a time period of 100 minutes, followed by further polymerization for 10 minutes (the temperature was controlled at 70° C. during polymerization). At this point, a sample of the polymer solution was taken and a conversion of butadiene was measured to give a value of 100%. Then, as the third step, a cyclohexane solution (concentration was 20% by weight) containing 7 parts by weight of styrene was charged over a time period of 10 minutes, followed by further polymerization for 10 minutes (the temperature was controlled at 70° C. during polymerization). At this point, a sample of the polymer solution was taken and a conversion of styrene was measured to give a value of 100%.

The obtained block copolymer had a styrene content of 14.0% by weight, a vinyl bond content of the butadiene block portion of 76.8%, a weight average molecular weight of 188 thousands, and a molecular weight distribution of 1.06. The results of analysis of the obtained copolymer are shown in Table 1. Further, measurement of a molecular weight and a molecular weight distribution of the styrene block of the copolymer showed the weight average molecular weight of 12.9 thousands and the molecular weight distribution of 1.10.

Then, to the obtained block copolymer was added the following hydrogenation catalyst in an amount of 100 ppm as titanium based on 100 parts by weight of the block copolymer and a hydrogenation reaction was conducted under a hydrogen pressure of 0.7 MPa at a temperature of 70° C. Thereafter, methanol was added and, successively, octadecyl-3-(3,5-di-t-butyl-4-hydroxyphenyl)propionate was added as a stabilizer in an amount of 0.3 part by mass based on 100 parts by mass of the block copolymer.

A degree of hydrogenation of the obtained hydrogenated copolymer was 98% and a tensile strength thereof was 124 kg/cm$^2$.

[Preparation of a Hydrogenation Catalyst]

1 L of dried and purified cyclohexane was charged in a reaction vessel, the atmosphere of which was displaced with nitrogen, and 100 mmol of bis(cyclopentadienyl)titanium dichloride was added. While stirring sufficiently, an n-hexane solution containing 200 mmol of trimethylaluminum was added and the mixture was reacted for about 3 days at room temperature.

Example 2

A block copolymer was prepared in a similar manner as in Example 1, except that the amount of TMEDA was changed to 2.0 mol and the amount of NaOAm was changed to 0.04 mol.

The results of analysis of the obtained copolymer are shown in Table 1.

Example 3

A block copolymer was prepared in a similar manner as in Example 1, except that sodium t-butoxide (hereinafter referred to as NaOBu) was used instead of NaOAm.

The results of analysis of the obtained copolymer are shown in Table 1.

Then, the obtained copolymer was hydrogenated in the same manner as in Example 1 to give a hydrogenated copolymer.

A degree of hydrogenation of the obtained hydrogenated copolymer was 99% and a tensile strength thereof was 122 kg/cm$^2$.

Example 4

A block copolymer was prepared in the same manner as in Example 1, except that the amount of Bu-Li was changed to 0.09 part by weight and the amount of NaOAm was changed to 0.05 mol.

The results of analysis of the obtained copolymer are shown in Table 1.

Example 5

A hydrogenated block copolymer was obtained in a similar manner as in Example 1, except that a cyclohexane solution (concentration was 20% by weight) of 22.5 parts by weight of styrene was used in the first step, a cyclohexane solution (concentration was 20% by weight) of 55 parts by weight of butadiene was used in the second step, a cyclohexane solution (concentration was 20% by weight) of 22.5 parts by weight of styrene was used in the third step, and 0.088 part by weight of Bu-Li was added.

A degree of hydrogenation of the obtained hydrogenated copolymer was 99% and a tensile strength thereof was 378 kg/cm$^2$.

Comparative Example 1

A block copolymer was prepared as in Example 1, except that NaOAm was not added.

In samples of the polymer solution, taken in the same manner as in Example 1, there were unreacted monomers present.

The results of analysis of the obtained copolymer are shown in Table 1. Also, measurement of a molecular weight and a molecular weight distribution of the styrene block of the copolymer showed weight average molecular weight of 9.6 thousands and a molecular weight distribution of 1.26.

Thereafter, the obtained copolymer was subjected to a hydrogenation reaction in the same manner as in Example to give a hydrogenated copolymer. A degree of hydrogenation of the obtained hydrogenated copolymer was 98% and a tensile strength thereof was 38 kg/cm$^2$.

Comparative Example 2

Polymerization was carried out under a similar polymerization condition as in Comparative Example 1, except that, in every step, the polymerization time was elongated until the monomer disappeared completely. As a result, polymerization required 80 minutes in the first step, 150 minutes in the second step, and 80 minutes in the third step, showing that the rate of polymerization is lower than in Examples. (Productivity is 2 or more times higher in Examples than in Comparative Examples).

The obtained copolymer showed a styrene content of 14.0% by weight, a vinyl bond content of the butadiene block portion of 67.2%, a weight average molecular weight of 182 thousands, and a molecular weight distribution of 1.10.

Comparative Example 3

A block copolymer was prepared in a similar manner as in Example 1, except that the amount of NaOAm was changed to 0.12 mol.

The results of analysis of the obtained copolymer are shown in Table 1. In GPC, the copolymer showed a peak at a high molecular weight region and had a broad molecular weight distribution.

Comparative Example 4

A block copolymer was prepared in a similar manner as in Example 1, except that the amount of NaOAm was changed to 0.50 mol.

The results of analysis of the obtained copolymer are shown in Table 1. In the GPC measurement, the copolymer showed a larger peak at a high molecular weight region than in Comparative Example 3 and had a broader molecular weight distribution.

TABLE 1

| | Polymerization conditions | | | Analytical results | | Results of analysis of copolymer | | | | |
|---|---|---|---|---|---|---|---|---|---|---|
| | | | NaOR | Conversion (%) | | Amount of | Vinyl bond | GPC | | |
| | Li catalyst (phm) | Amine (mol/Li) | (molar ratio*) | Monomer | After 10 minutes** | styrene (% by weight) | content*** (%) | Mw (ten thousands) | Mn (ten thousands) | Mw/Mn |
| Example 1 | Bu-Li 0.06 | TMEDA 1.8 | NaOAm 0.055 | 1st. St 2nd. Bd 3rd. St | 100 100 100 | 14.0 | 76.8 | 18.8 | 17.8 | 1.06 |
| Example 2 | Bu-Li 0.06 | TMEDA 2.0 | NaOAm 0.04 | 1st. St 2nd. Bd 3rd. St | 100 100 100 | 13.8 | 76.6 | 18.6 | 17.4 | 1.07 |

TABLE 1-continued

| | Polymerization conditions | | | Analytical results | | Results of analysis of copolymer | | | | |
|---|---|---|---|---|---|---|---|---|---|---|
| | | | NaOR | Conversion (%) | | Amount of | Vinyl bond | GPC | | |
| | Li catalyst (phm) | Amine (mol/Li) | (molar ratio*) | Monomer | After 10 minutes** | styrene (% by weight) | content*** (%) | Mw (ten thousands) | Mn (ten thousands) | Mw/Mn |
| Example 3 | Bu-Li 0.06 | TMEDA 1.8 | NaOBu 0.055 | 1st. St 2nd. Bd 3rd. St | 100 100 100 | 13.8 | 77.0 | 18.3 | 17.2 | 1.06 |
| Example 4 | Bu-Li 0.09 | TMEDA 1.8 | NaOAm 0.05 | 1st. St 2nd. Bd 3rd. St | 100 100 100 | 14.0 | 76.4 | 12.6 | 12.0 | 1.05 |
| Example 5 | Bu-Li 0.088 | TMEDA 1.8 | NaOAm 0.055 | 1st. St 2nd. Bd 3rd. St | 100 100 100 | 45.2 | 74.3 | 9.5 | 9.2 | 1.03 |
| Comparative Example 1 | Bu-Li 0.06 | TMEDA 1.8 | 0 | 1st. St 2nd. Bd 3rd. St | 75 97 72 | 12.6 | 66.4 | 16.2 | 13.8 | 1.17 |
| Comparative Example 3 | Bu-Li 0.06 | TMEDA 1.8 | NaOAm 0.12 | 1st. St 2nd. Bd 3rd. St | 100 100 100 | 13.8 | 77.5 | 19.6 | 15.9 | 1.23 |
| Comparative Example 4 | Bu-Li 0.06 | TMEDA 1.8 | NaOAm 0.50 | 1st. St 2nd. Bd 3rd. St | 100 100 100 | 13.8 | 77.8 | 21.3 | 15.7 | 1.36 |

*Molar ratio to amine
**Time after completion of monomer feeding
***Diene portion

INDUSTRIAL APPLICABILITY

According to the production process of the present invention, it becomes possible to obtain in high productivity a block copolymer having a conjugated diene block portion with a high vinyl bond content and a vinyl aromatic block portion with a narrow molecular weight distribution and exhibiting a narrow molecular weight distribution and high strength.

The block copolymer and hydrogenated product thereof, obtained according to the present invention, can be used not only as a substitute for a soft vinyl chloride resin but also in various applications such as packaging materials, automotive parts, and medical devices. Therefore, the present invention whereby the copolymer can be easily produced is very useful.

The invention claimed is:

1. A process for producing a block copolymer, comprising copolymerizing a conjugated diene monomer and vinyl aromatic monomer in presence of a lithium initiator, (1) a tertiary amine compound, and (2) sodium alkoxide, wherein (2)/(1)(a molar ratio)=from 0.01 to less than 0.1.

2. The process for producing the block copolymer according to claim 1, wherein the conjugated diene monomer is 1,3-butadiene and the vinyl aromatic monomer is styrene.

3. The process for producing the block copolymer according to claim 1, wherein (2)/(1) (the molar ratio)=from 0.03 to less than 0.08.

4. A process for producing a block copolymer, comprising hydrogenating in the presence of a titanocene compound after the polymerization by the process according to claim 1 followed by hydrogenation.

5. The process for producing the block copolymer according to claim 2, wherein (2)/(1) (the molar ratio)=from 0.03 to less than 0.08.

6. A process for producing a block copolymer, comprising hydrogenating in the presence of a titanocene compound after the polymerization by the process according to claim 2 followed by hydrogenation.

7. A process for producing a block copolymer, comprising hydrogenating in the presence of a titanocene compound after the polymerization by the process according to claim 3 followed by hydrogenation.

8. A process for producing a block copolymer, comprising hydrogenating in the presence of a titanocene compound after the polymerization by the process according to claim 5 followed by hydrogenation.

9. The process for producing the block copolymer according to claim 1, wherein the amount of the tertiary amine compound is from 0.1 to 4 (mol/Li) based on the lithium initiator.

10. The process for producing the block copolymer according to claim 2, wherein the amount of the tertiary amine compound is from 0.1 to 4 (mol/Li) based on the lithium initiator.

11. The process for producing the block copolymer according to claim 3, wherein the amount of the tertiary amine compound is from 0.1 to 4 (mol/Li) based on the lithium initiator.

12. The process for producing the block copolymer according to claim 4, wherein the amount of the tertiary amine compound is from 0.1 to 4 (mol/Li) based on the lithium initiator.

13. The process for producing the block copolymer according to claim 1, wherein the amount of the tertiary amine compound is from 0.2 to 3 (mol/Li) based on the lithium initiator.

14. The process for producing the block copolymer according to claim 2, wherein the amount of the tertiary amine compound is from 0.2 to 3 (mol/Li) based on the lithium initiator.

15. The process for producing the block copolymer according to claim 3, wherein the amount of the tertiary amine compound is from 0.2 to 3 (mol/Li) based on the lithium initiator.

16. The process for producing the block copolymer according to claim 4, wherein the amount of the tertiary amine compound is from 0.2 to 3 (mol/Li) based on the lithium initiator.

17. The process for producing the block copolymer according to claim 1, wherein the amount of the tertiary amine compound is from 0.2 to 2 (mol/Li) based on the lithium initiator.

18. The process for producing the block copolymer according to claim 2, wherein the amount of the tertiary amine compound is from 0.2 to 2 (mol/Li) based on the lithium initiator.

19. The process for producing the block copolymer according to claim 3, wherein the amount of the tertiary amine compound is from 0.2 to 2 (mol/Li) based on the lithium initiator.

20. The process for producing the block copolymer according to claim 4, wherein the amount of the tertiary amine compound is from 0.2 to 2 (mol/Li) based on the lithium initiator.

* * * * *